(12) United States Patent
Maslov et al.

(10) Patent No.: US 6,949,864 B2
(45) Date of Patent: Sep. 27, 2005

(54) ROTARY ELECTRIC MOTOR HAVING CONCENTRIC ANNULAR MEMBERS

(75) Inventors: Boris Maslov, Reston, VA (US); Alexander Pyntikov, Ashburn, VA (US)

(73) Assignee: Wavecrest Laboratories, LLC, Herndon, VA (US)

( * ) Notice: Subject to any disclaimer, the term of this patent is extended or adjusted under 35 U.S.C. 154(b) by 835 days.

(21) Appl. No.: 09/826,422

(22) Filed: Apr. 5, 2001

(65) Prior Publication Data

US 2003/0193263 A1 Oct. 16, 2003

Related U.S. Application Data

(60) Provisional application No. 60/194,594, filed on Apr. 5, 2000.

(51) Int. Cl.[7] ................................................ H02K 1/12
(52) U.S. Cl. ...................................................... 310/254
(58) Field of Search ................................ 310/254, 138, 310/145, 185

(56) References Cited

U.S. PATENT DOCUMENTS

| | | | |
|---|---|---|---|
| 3,214,663 A | 10/1965 | Kreutzer | |
| 4,315,171 A | * 2/1982 | Schaeffer | 310/12 |
| 4,754,207 A | * 6/1988 | Heidelberg et al. | 310/185 |
| 5,015,903 A | * 5/1991 | Hancock et al. | 310/168 |
| 5,023,527 A | 6/1991 | Erdman et al. | 318/254 |
| 5,164,623 A | 11/1992 | Shkondin | 310/67 R |
| 5,625,353 A | 4/1997 | Momose | 340/870.03 |
| 5,918,360 A | * 7/1999 | Forbes et al. | 29/596 |
| 6,094,011 A | * 7/2000 | Notsu | 307/10.8 |
| 6,114,789 A | 9/2000 | Pengov et al. | 310/166 |
| 6,169,350 B1 | 1/2001 | Yang | 310/216 |
| 6,181,035 B1 | * 1/2001 | Acquaviva | 310/156.16 |
| 6,278,216 B1 | * 8/2001 | Li | 310/254 |

FOREIGN PATENT DOCUMENTS

DE   199 09 227 A 1   10/1999   .......... H02K/37/16

* cited by examiner

Primary Examiner—Darren Schuberg
Assistant Examiner—Nguyen Hanh
(74) Attorney, Agent, or Firm—McDermott Will & Emery LLP (57) ABSTRACT

A rotary electric motor in which rotor and stator members are each configured as annular rings, concentric with respect to each other, about an axis of rotation. Either of the rotor or stator members is formed of groups of electromagnet poles, the groups substantially equidistantly distributed along the angular extent of the annular ring, each of the groups comprising magnetic material magnetically isolated and separated from the other groups. The other member comprises a plurality of permanent magnet poles substantially equidistantly distributed with alternating magnetic polarity along the angular extent of the radial air gap formed between the members, the permanent magnet poles having a common magnetic return path.

12 Claims, 8 Drawing Sheets

ROTARY ELECTRIC MOTOR HAVING CONCENTRIC ANNULAR MEMBERS

RELATED APPLICATIONS

The present application claims priority of U.S. Provisional Patent Application ser. No. 60/194,594, filed Apr. 5, 2000. This application contains subject matter related to applicants' copending U.S. application Ser. No. 09/571,174, filed May 16, 2000, and copending U.S. application Ser. No. 09/826,423, filed concurrently herewith.

FIELD OF THE INVENTION

The present invention relates to rotary direct current electric motors, more particularly to motors having first and second annular ring members concentrically arranged about an axis of rotation and separated from each other by a radial air gap, one of the members comprising separate magnetically isolated wound electromagnetic pole groups.

BACKGROUND

Direct current motors have versatility in a wide range of applications. The availability of a battery power source for dc motor equipped devices facilitates a portability aspect that is not readily available for a-c motor drives. Electronic controls, such as microprocessor based systems, for a wide variety of functional applications have become commonplace. As development of the battery has progressed, and the versatility of electronic controls has expanded, the challenge of providing efficient direct current motor drives for vehicles, as a viable alternative to combustion engines, has become more compelling. U.S. Pat. No. 5,164,623 to Shkondin is one example of a proposed implementation in which a motor is mounted on the wheel of a vehicle for directly driving the vehicle. The patent proposes that such an arrangement can be applicable to electric cars, bicycles, wheelchairs and the like.

Electronically controlled energization of windings of direct current motors offers the prospect of more flexible management of motor characteristics. The use of permanent magnets in conjunction with such windings is advantageous in limiting current consumption. U.S. Pat. No. 4,754,207 to Heidelberg et al. describes a direct current motor having a rotor composed of a continuous ring of a plurality of permanent magnets successively alternating in polarity. The stator, comprising a plurality of electronically switchable electromagnet poles, is circumferentially separated from the rotor magnets by a radial air gap. Several adjacent stator electromagnets form a phase group. The inward base portions of adjacent electromagnet poles in each group are in surface area contact with each other to form a continuous magnetic flux path. The electromagnetic circuit is broken at transition points between adjacent groups of electromagnets. Sensors detect relative rotational position between rotor and stator elements to control electronic switching of the individual electromagnet windings. Electromagnets belonging to a common group are switched simultaneously with one common electronic switching means per group. Windings of the electromagnets in adjacent groups are of different phases and are switched at different times.

Of concern in implementation of stator winding switched energization is the avoidance of unfavorable consequences such as rotation irregularities. For example, simultaneous switching of all motor phase windings can cause pulsating output torque. Alleviation of these effects, with varying success, can be obtained by appropriately switching all phases at different times or by simultaneously switching certain winding combinations that are distributed symmetrically about the stator periphery and bear certain positional relationships with the permanent magnet poles of the rotor. However, switching of adjacent windings at different times leads to detrimental effects if the windings are linked to a continuous magnetic circuit path, as the flux changes due to the changed energization of the winding of one pole effects the flux of an adjacent pole.

Heidelberg et al. alleviates this problem to some extent by grouping pluralities of stator poles in separate magnetic circuit paths. The magnetic circuit path discontinuity between adjacent groups effects an isolation of magnetic flux, thus reducing transformer like magnetic flux interference between groups. However, where all poles of a group are wound and switched simultaneously, a torque ripple effect can still exist. Heidelberg et al. provides modifications in which some poles of a group are not wound and/or the pole structure of all poles within a group are not of uniform configuration, thus deterring the effects of torque ripple and flux interference between adjacent poles. Such modifications sacrifice torque characteristics. If fewer poles is are wound, flux generation capability is reduced. The unwound poles do not contribute to torque and can negatively interact with rotor permanent magnets. Non-uniform pole configuration modifications in Heidelberg et al. are coupled with non-uniform pole windings. Such configurations complicate the manufacturing process and compromise motor efficiency.

The need remains for an improved motor amenable to simplified manufacture and capable of efficient flexible operating characteristics. In the particular vehicle drive environment, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience.

DISCLOSURE OF THE INVENTION

The present invention fulfills the above-described needs, at least in part, in the provision of a rotary direct current electric motor in which rotor and stator members are each configured as annular rings, concentric with respect to each other, about an axis of rotation. Either of the rotor or stator members is formed of groups of electromagnet pole pairs, the groups substantially equidistantly distributed along the angular extent of the annular ring, each of the groups comprising magnetic material magnetically isolated and separated from the other groups. The other member comprises a plurality of permanent magnet poles substantially equidistantly distributed with alternating magnetic polarity along the angular extent of the radial air gap formed between the members, the permanent magnet poles having a common magnetic return path. The poles of each group of electromagnet pole pairs are wound, the windings together being switchably energized for driving electromotive interaction between the stator and rotor. Thus, an even number of poles, two per pole pair, are provided for each electromagnet group. The poles of each pole pair are oppositely wound to provide opposite north/south polarities.

While each group can comprise a plurality of poles, it is preferable to provide only a single pole pair for each group. Switched energization of only a single pole pair, wherein current in the windings is reversed, aids change of magnetic polarities of the poles without deleterious flux effects for the particular pole pair. Magnetic path isolation of the individual pole pair from other pole groups eliminates a flux transformer effect on an adjacent group when the energization of the pole pair windings is switched. The lack of additional pole pairs within the group eliminates precludes any such effects within a group.

By appropriately timing the switched winding energization for each of the groups, development of smooth electromotive force throughout the motor is attained. The precise optimum phase and sequence for timed switching of particular groups is dependent upon the particular structural configuration of electromagnetic poles, permanent magnet poles, spacing among various poles and other structural interrelationships. Upon determination of the optimum timed switching sequence for a specific motor configuration, implementation of a switching scheme can be made dependent upon relative position between rotor and stator. Switching may be performed by a mechanical commutator or electronic activation in response to signals generated by a position sensor. While various position sensing means are well known in the art, any of which may be employed to generate such signals, the use of a resolver has been found to be preferable. The resolver output can then be used by an encoder to encode signals for application to a microprocessor based control circuit.

While the present invention has useful applicability in various motor drive applications, it is advantageously suitable for a vehicle drive in which the rotor is structured to surround the stator, the rotor being secured to a housing for direct attachment to a vehicle wheel. The annular rotor is thus at a substantial radial distance from the axis of rotation. The rotor housing is journalled for rotation about a stationary shaft at the axis of rotation through bearings. In an embodiment in which the rotor comprises permanent magnets, a large number of permanent magnets can be substantially evenly distributed along the annular ring. As a programmed microprocessor has the capability of generating extremely high rate of switching signals, a wide vehicle speed range is available without need for transmission gear shifting. The groups of separate electromagnets form a relatively thin annular stator ring that is spaced from the axis of rotation by a radial distance, which preferably is substantially greater than the radial dimension between inner and outer diameter boundaries of the stator ring, and secured to the shaft. The configuration of the present invention, wherein electromagnet pole pairs each form isolated magnetic structures formed in a thin annular ring, has been found to provide advantageous effects. With this arrangement, flux can be concentrated, with virtually no loss or deleterious transformer interference effects, at the radial air gap for optimum interaction with the permanent magnet rotor. As a result, extremely high torque is available with a high efficiency that significantly extends battery life.

As an additional advantage, each stator group is individually secured in the stator annular ring structure, wherein removal and replacement of an individual stator group is facilitated. Thus, if a particular stator winding group should become damaged, for example by a fault in the pole structure or winding, the individual stator group can be replaced without removing or replacing the entire stator unit. As a related advantage, with the use of a large number of single pole pair stator groups, the motor can continue to operate in a satisfactory manner even if one or more particular electromagnet pole group energization fails.

A further advantage of the present invention is that, to a large extent, stator and rotor pole face dimensions and spacings between poles are relatively independent of each other. A timed switched energization scheme can be programmed to be optimized for a particular structural configuration. A preferred embodiment, in which operation has been found to be particularly advantageous, implements the following structural features. An odd number of stator groups is utilized. The stator poles have pole faces at the air gap that are of substantially uniform angular extent. The permanent magnet rotor poles are of substantially equal angular dimensional extent at the air gap, which is different from the stator pole face dimension. The angular distance between the centers of the pole faces of each stator group is substantially uniform throughout the periphery of the stator and differs from the angular distance between the centers of the stator pole faces of adjacent groups. The angular distance between the centers of the pole faces of each stator group also is different from the angular distance between the centers of adjacent permanent magnet poles of the rotor. Gaps between adjacent stator pole faces within each group are substantially equal for all groups and different from gaps between adjacent stator groups. The rotor pole faces are separated substantially uniformly by gaps, the gaps between adjacent rotor pole faces being different from the gaps between adjacent stator pole face within a stator group.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
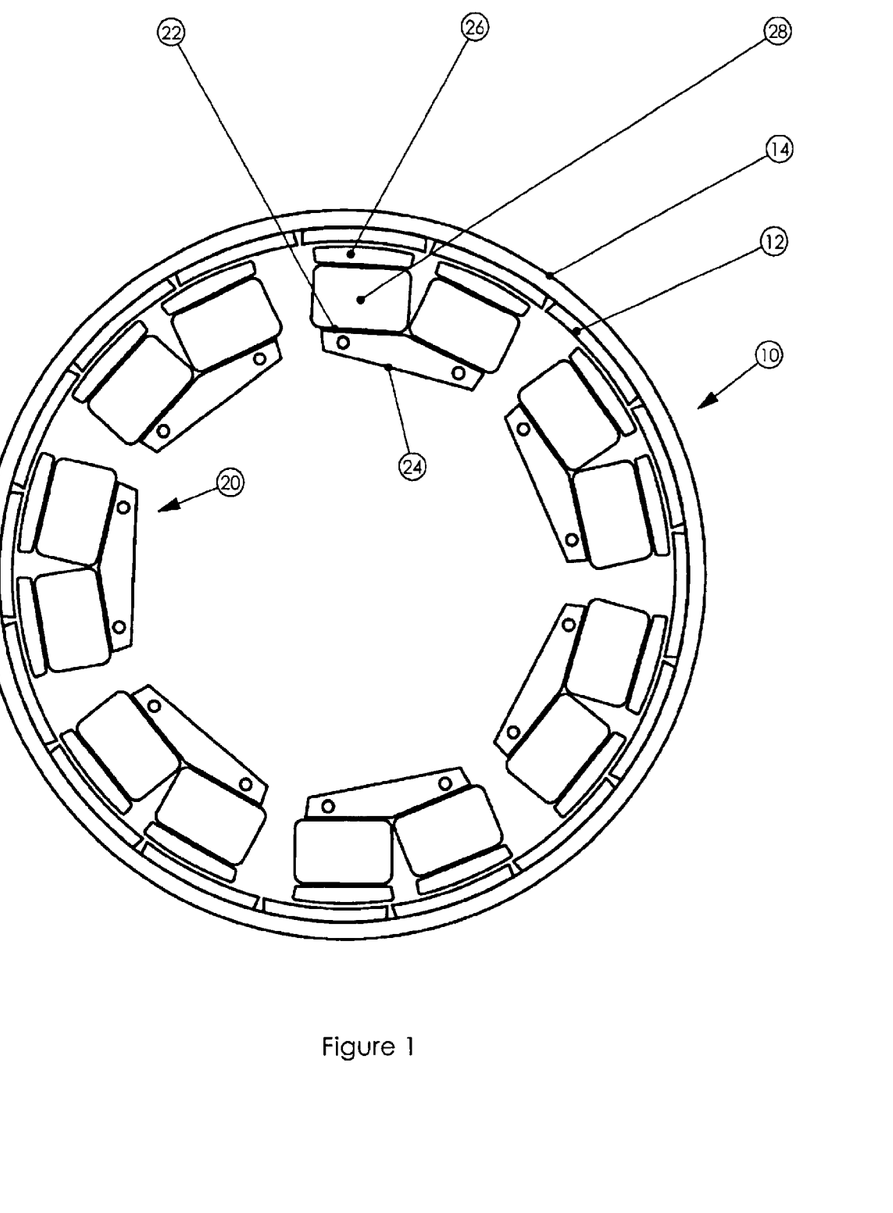
FIG. 1 is a plan diagram of a stator and rotor layout of a preferred embodiment of the motor of the present invention.

FIG. 1 is a plan diagram of a stator and rotor layout of a preferred embodiment of the motor of the present invention. Rotor member 10 is an annular ring structure having sixteen permanent magnets 12 substantially evenly distributed along cylindrical back plate 14. The permanent magnets are rotor poles that alternate in magnetic polarity along the inner periphery of the annular ring. The back plate comprises magnetically permeable material that serves as a magnetic return path between adjacent permanent magnetic poles 12. The rotor surrounds a stator member 20, the rotor and stator members being separated by a radial air gap. Stator 20 comprises seven elements or groups of pole pairs 22 of uniform construction that are evenly distributed along the air gap. Each stator group comprises a generally u-shaped magnetic structure 24 having two pole faces 26 at the air gap. Each stator group structure is separate, and magnetically isolated, from adjacent groups. The legs of the pole pairs are wound with windings 28. The windings of each stator group are connected together so as to be simultaneously activated when connected to a dc source of energization. The windings are configured to provide opposite north/south polarities to the poles of each pole pair, thereby forming an electromagnet. Reversal of polarity of energization effects reversal of the magnetic polarities of the pole pair. Appropriate timed switching of stator winding energization along the radial air gap effects electromotive force generation through interaction of magnetic forces between the stator and rotor across the air gap.

The rotor permanent magnet poles are all of uniform angular extent along the air gap and separated from each other by angular gaps of uniform extent. Subject to these uniformity relationships, the actual dimensions of the rotor pole faces and gaps therebetween are variable and can be optimized in accordance with application environment. It is to be understood that any even number of rotor poles may be employed, sixteen being shown in the FIG. 1 simply for purposes of illustration. The stator pole faces are all of uniform angular extent, preferably of a different dimension than that of the rotor angular pole face.

Stator elements 24 are secured, in a manner more fully described hereinafter, to a non magnetically permeable support structure, whereby the stator elements form an annular ring configuration. The poles within each stator group are separated by radial gaps that are uniform for all stator groups. The extent of these gaps is different from the spacing between poles of adjacent stator groups. The stator pole gaps and group spacings are each different from the rotor angular pole gaps. The radial extent of the stator annular structure, i.e., the distance between inner and outer diameters, is substantially less than the distance between the center axis of rotation and the inner diameter of the stator. This relatively narrow radial stator dimension provides a favorable concentration of flux within each stator element structure focussed at the air gap. By virtue of this configuration, and the absence of stray transformer flux effects from adjacent stator pole groups high torque output can be efficiently obtained.

The relatively independent dimensional relationships between the stator and rotor poles permits flexibility in setting the number of poles and dimensions. While an odd number of stator pole groups is preferred to enable optimum performance, this number is by no means limited to seven, as shown for purposes of illustration. Similarly, each stator pole pair group may comprise a plurality of pole pairs sharing a common isolated magnetically permeable structure, there being an even number of poles in each group. In an operational environment in which it is desirable to obtain fine control over a wide speed range, a large number of stator and rotor poles can be implemented. Such implementation can be coordinated with the control capabilities of control system to be used, the number of separate stator groups also being set accordingly. Although the motor can support a variety of specific applications, the invention is of particular advantageous utility for driving a vehicle, wherein the motor structure is housed within a wheel. The concentric rotor and stator members in such an environment are located at the wheel rim, at a substantial radial distance from the axis of rotation. The large rim diameter provides ample room to accommodate a large plurality of individual rotor and stator poles, thus facilitating flexibility of control.

Figure 2:
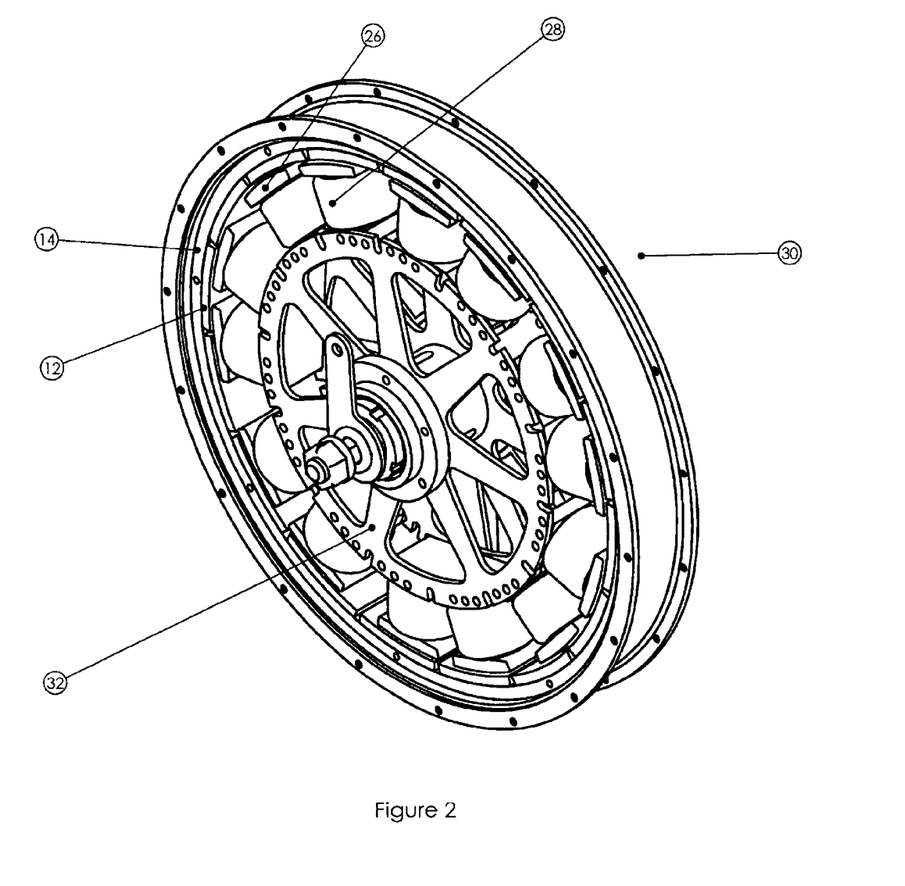
FIG. 2 is three dimensional perspective diagram of the stator and rotor pole structure of the embodiment of FIG. 1.
Figure 3:
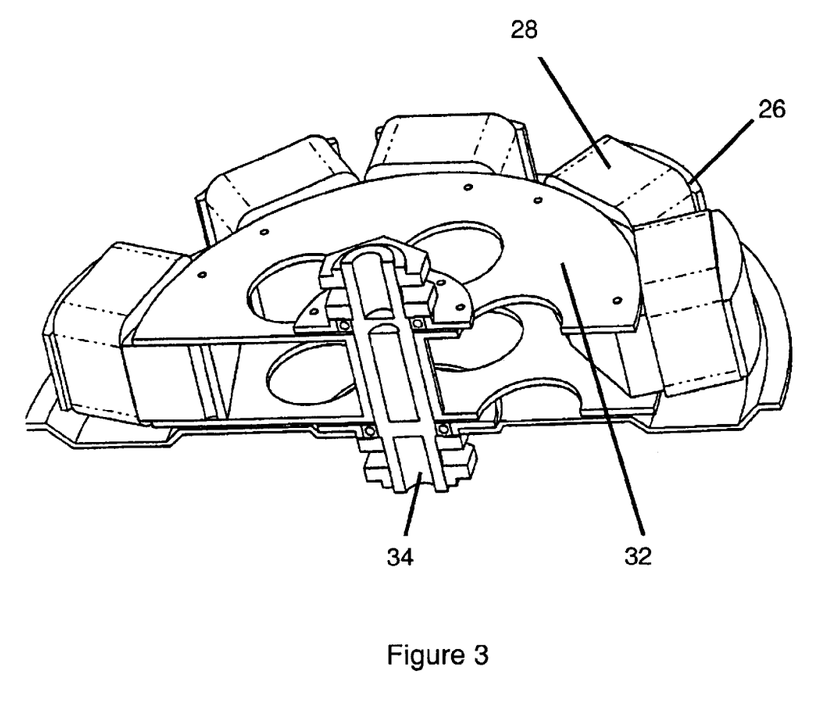
FIG. 3 is a partial cutaway diagram taken at a section of FIG. 2, illustrating the stator structure of the present invention.

FIG. 2 is a perspective view of a rotor and stator assembly of the motor embodiment of FIG. 1. The annular rotor, including back plate 14 and permanent magnets 12, is enclosed by a ring housing member 30, which may be formed of aluminum or other non magnetic or nonferrous material. Within this cylindrical rotor structure, the stator groups are rigidly secured by two plates 32, only one of which is shown in FIG. 2. FIG. 3 is a cutaway view of the stator structure taken at a section intersecting shaft 34 at the axis of rotation. Each plate 32 is a of rigid circular configuration having an outer diameter and a circular cutout portion at its center that forms an inner diameter. The inner diameter is sized to fit the stationary shaft 34 and to be affixed to a shaft member. Along the plate periphery, the plate is provided with holes appropriately spaced to mate with corresponding through holes in the stator elements. Each of the plates 32 is secured to the shaft 34 and spaced from each other appropriately to be secured to, and sandwich, the pole structures 24 of the stator elements at each axial side thereof via the mating holes. The plates can be selectably removable to facilitate removal and replacement of an individual stator element that may become damaged or in need of repair, without replacement of the entire unit. As each of the stator elements can be made interchangeable, maintenance of the stator is a relatively simple matter of inserting a spare stator element at the appropriate mating position between the plates and connecting the ends of the windings.

Figure 4:
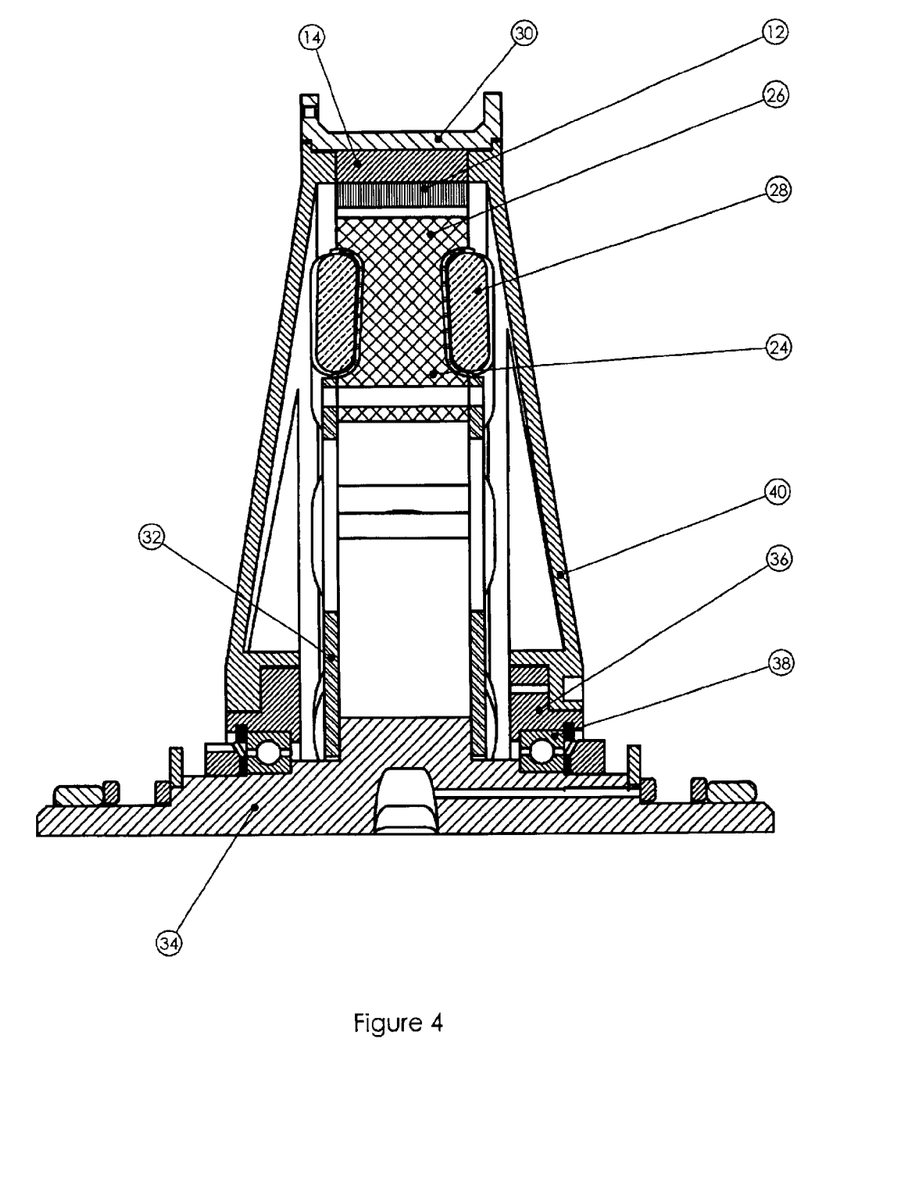
FIG. 4 is a partial detailed sectional diagram illustrating the motor structure of the invention, particularly suitable for use in driving a vehicle wheel.
Figure 5:
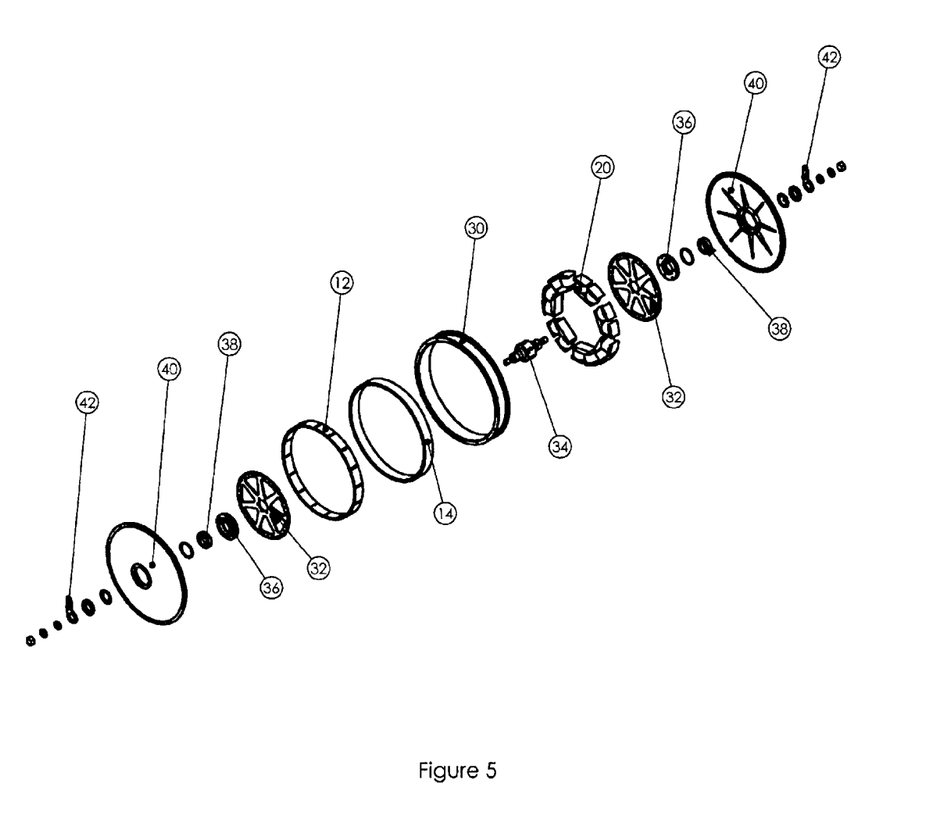
FIG. 5 is an exploded view of the motor structure shown partially in section in FIG. 4.
Figure 6:
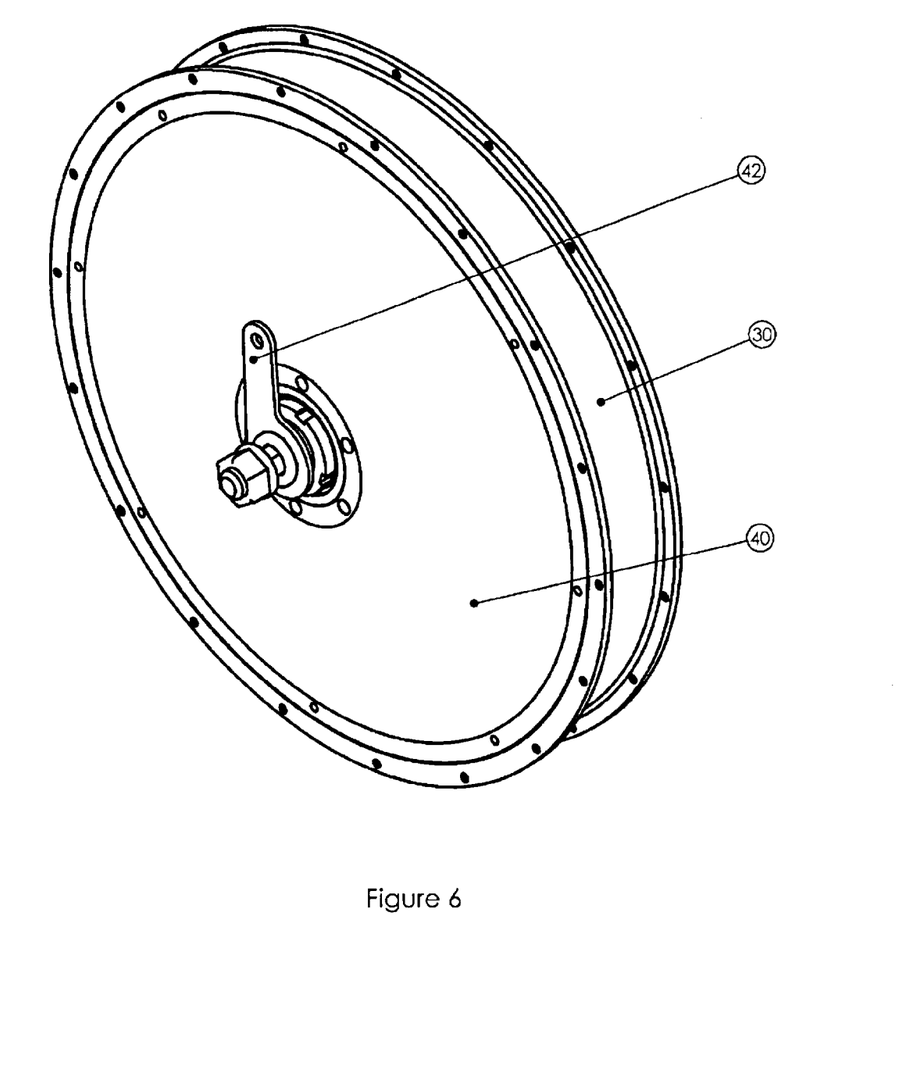
FIG. 6 is a perspective outside view of an assembled wheel hub housing enclosing the motor in accordance with the present invention.

FIG. 4 is a more detailed sectional diagram illustrating the motor structure of this embodiment of the invention, particularly suitable for use in driving a vehicle wheel of an automobile, motorcycle, bicycle, or the like. The stationary shaft 34, plates 32, stator structures 24 and windings 28, are contained within housing 40, to which annular rotor backplate 14 and permanent magnets 12 are attached. Housing 40 is journalled to the shaft on each side of plates 32 through bushings 36 and bearings 38. Thus housing 40 forms side portions of a vehicle wheel that rotates, as driven through the rotor, about shaft 34. The ring housing member 30 is rigidly attached to housing 40 and the rotor, and functions as a rim for fitting a vehicle tire. FIG. 5 is an exploded view of the motor structure shown partially in section in FIG. 4, while FIG. 6 is a perspective outside view of the assembled wheel hub portion. Connector portions 42 are provided to illustrate use of the motor in a bicycle type environment each of connector portions 42 can be affixed to a respective portion of a bicycle fork. The drawing figures also exemplify the use of various standard washer, nut and bolt elements for assembling various elements. It is to understood that any appropriate means well known in the art can be used for assembly of the various elements.

Figure 7:
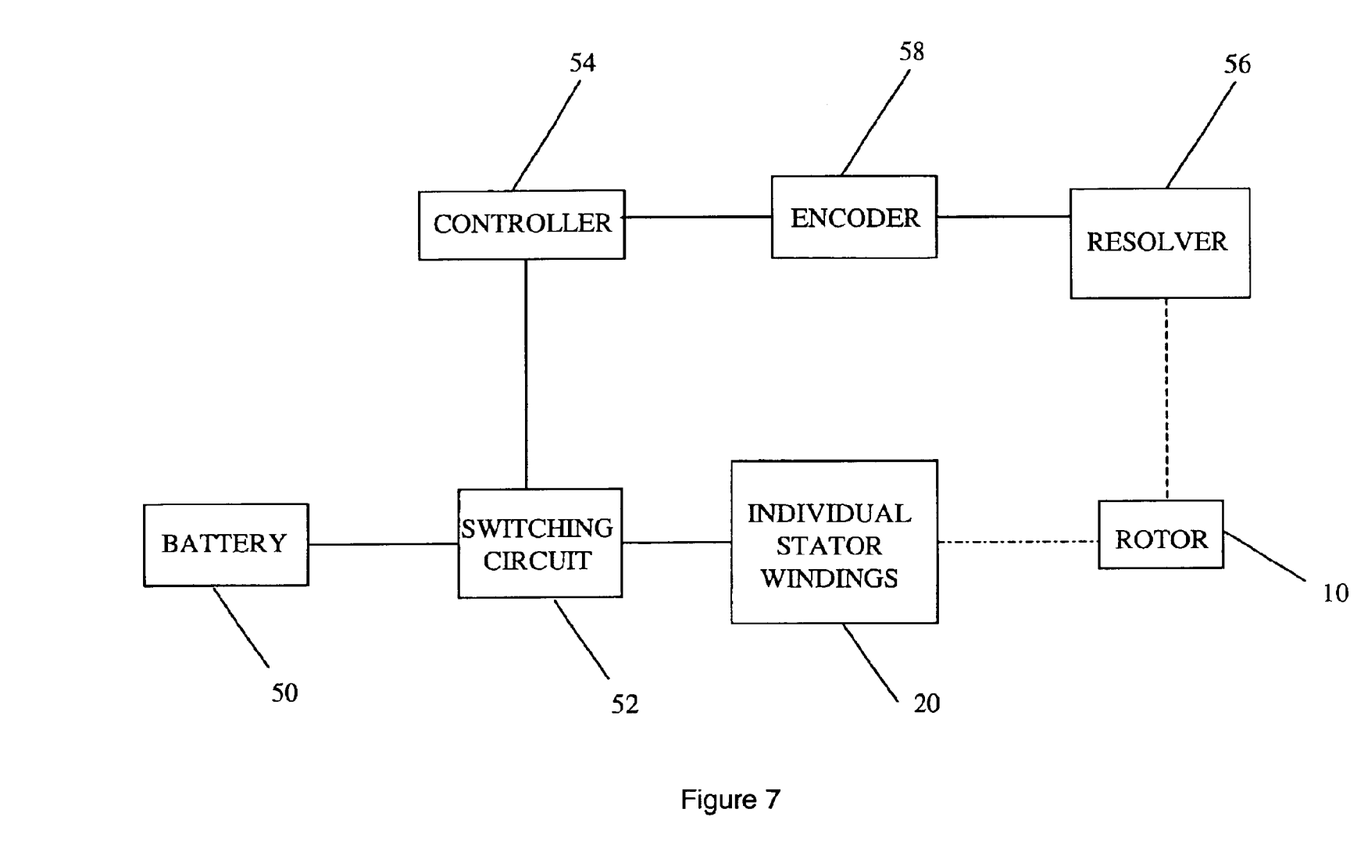
FIG. 7 is a block diagram illustrative of a control system for driving the motor of the present invention.

FIG. 7 is a block diagram illustrative of a control system for driving the motor of the invention of the embodiment of FIG. 1. Energizing current for the individual stator electromagnet windings 20 is provided by battery supply source 50. Although switched energization of the stator windings can be implemented using a well known mechanical commutator arrangement, electronic switching circuits have become commonplace and provide superior control advantages. It is preferable, therefore, to connect stator windings 20 to battery 50 through switching circuit 52. Switching circuit 52 may comprise any well known controlled bidirectional electronic circuit capable of supplying battery energization, switchable in polarity, individually to the motor windings, under control of controller 54. Controller 54 preferably comprises a microcontroller, microprocessor or the like that call be programmed to apply appropriately timed control signals to switching circuit 52 in accordance with feedback signals generated in response to the relative movement between stator and rotor. Various position sensors are known in the art that are capable of producing motor feedback signals for utilization by the controller. Resolver 56 is coupled to rotate with rotor 10 and generates signals indicative of rotor angular position. These signals are encoded by encoder 58 appropriately for use by the controller. The controller can be programmed to output optimally timed control signals to be matched with the received encoder signals, based on the specific dimensional configuration of the stator elements. Programming can thus take into account the number of stator and rotor poles, the number of stator groupings, the dimensions of the stator and rotor poles and the dimensions of the various gaps in the motor structure. It has been found that the superior motor torque and speed characteristics obtained from the above described structure operating in the optimally programmed controlled electronic switched mode enables satisfactory operation even if an individual stator element group cannot function. Thus a vehicle in such circumstance can continue to be used until such time as it is convenient to replace the stator element part.

Figure 8:
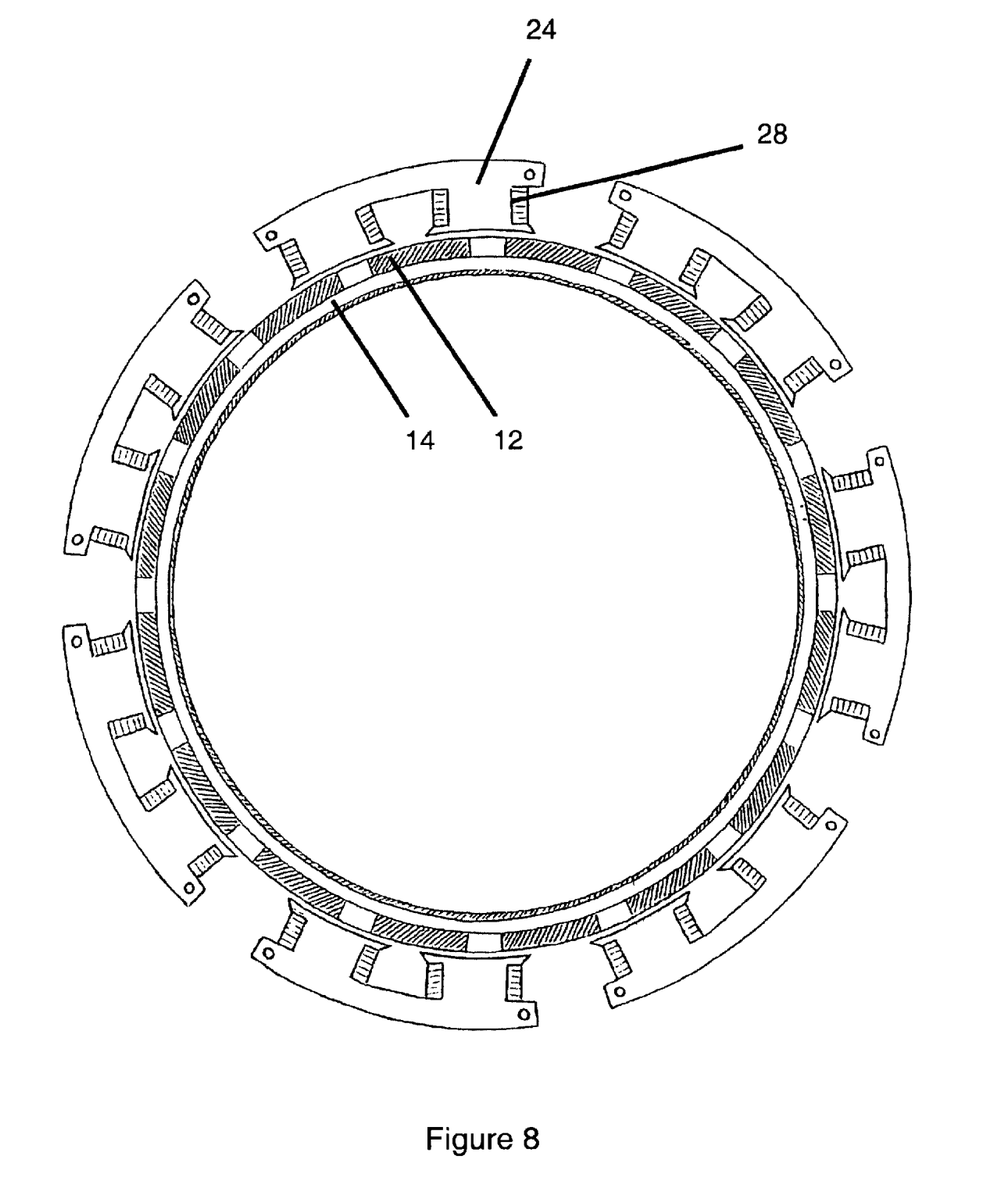
FIG. 8 is a schematic plan view of an alternative embodiment of the present invention in which the rotor comprises separate electromagnet groups of pole pairs which surround via a radial air gap a permanent magnet stator.

FIG. 8 is a schematic plan view of an embodiment in which the rotor comprises separate electromagnet groups of pole pairs which surround via a radial air gap a permanent magnet stator. In this respect, this plan view is similar to the structure disclosed in the inventors' copending application, Ser. No. 09/571,174 filed May 16, 2000, the disclosure of which hereby is incorporated by reference. The structural arrangement and assembly of the elements of this embodiment are analogous to the embodiment illustrated in FIGS. 2–6.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, the motor of the invention can be utilized in a wide range of applications in addition to vehicle drives. While it is preferred, in the implementation of a vehicle drive, that the rotor surround the stator, other applications may find advantageous utility with the stator surrounding the stator. Thus, it is within the contemplation of the invention that each inner and outer annular member may comprise either the stator or rotor and may comprise either the group of electromagnets or permanent magnet ring. Also, while wound salient poles have been illustrated, windings may instead be provided in a non-salient slotted structure.

It should also be appreciated that particular electromagnet energization sequences can vary depending on various considerations. Energization of the electromagnets may be switched sequentially along the air gap periphery or in a different order. Electromagnet groups may all be energized at all times, although switched at individually programmed times. Conversely, individual electromagnets may be de-energized at predetermined sequentially induced, randomly induced, or non-sequentially induced intervals.

Although the present invention has been exemplified herein in the context of a direct current motor, one of ordinary skill in the art would appreciate that the principles described are applicable to synchronous type alternating current motors and motors having wound elements energizable by a variety of pulse waveforms. Thus, the source of electrical power for driving the motor is not limited to a battery, buy may include, for example, an alternating current source. Such an alternating current source can be converted to direct current or pulse waveform supply or can be used without such conversion to drive the motor as an alternating current synchronous motor.

What is claimed is:
1. A rotary electric motor comprising:
   a stator configured in the form of an annular ring having a plurality of groups of electromagnet poles, the groups substantially equidistantly distributed along the angular extent of the annular ring, each of the groups comprising magnetic material magnetically isolated and separated from the other groups, the electromagnet poles having pole faces separated from each other by gaps, gaps between pole faces within each group being of a substantially uniform first angular distance; and an annular rotor, concentric with an axis of rotation and concentric with the annular stator to form a radial air gap therebetween, comprising a plurality of permanent magnets substantially equidistantly distributed with alternating magnetic polarity along the angular extent of the air gap and separated from each other by gaps of a second angular distance different from the first angular distance, the permanent magnets having a common magnetic return path;

wherein each group of electromagnet poles comprises windings that are switchably energized for driving electromotive interaction between the stator and rotor.

2. A rotary electric motor as recited in claim 1, wherein each stator group comprises no more than a single pair of poles, each pole having a winding configured to form a magnetic polarity opposite to the magnetic polarity of the other pole of the pair, wherein switched energization of the pole pair winding effects reversal of the magnetic polarities of the pole pair.

3. A rotary electric motor as recited in claim 1, further comprising a rotor position sensor, wherein signals for switching energization of the windings are generated in response to the sensor.

4. A rotary electric motor as recited in claim 3, wherein said position sensor comprises a resolver;

and said motor further comprises an encoder for generating said signals.

5. A rotary electric motor as recited in claim 1, wherein the angular distance of the gaps between adjacent pole faces of each stator group differs from the angular distance of the gaps between adjacent stator pole faces of adjacent groups.

6. A rotary electric motor as recited in claim 5, wherein the angular distance of the gaps between adjacent poles of adjacent stator groups is different from the angular distance of the gaps between adjacent permanent magnets of the rotor.

7. A rotary electric motor as recited in claim 1, wherein the rotor surrounds the stator.

8. A rotary electric motor as recited in claim 1, wherein the number of stator groups is an odd number and the number of poles within each stator group is an even number.

9. A rotary electric motor as recited in claim 1, wherein each stator group is individually secured to a non-magnetically permeable support structure, thereby facilitating independent removal and replacement of an individual stator group and a switched energization circuit component associated therewith.

10. A rotary electric motor as recited in claim 9, wherein said support structure comprises:

a plate member; and a shaft member located at the axis of rotation;

wherein each of said stator groups is secured to said plate member at a spaced radial distance from the axis of rotation; and said plate member is attached to said shaft member.

11. A rotary electric motor as recited in claim 10, wherein said spaced radial distance is greater than the radial distance between inner and outer boundary diameters of the stator annular ring.

12. A rotary electric motor as recited in claim 9, wherein said motor further comprises a rotor housing, the rotor annular rotor being mounted within the housing at a spaced radial distance from the axis of rotation, and the rotor housing is journalled for rotation about the shaft through bearings.

* * * * *